UNITED STATES PATENT OFFICE.

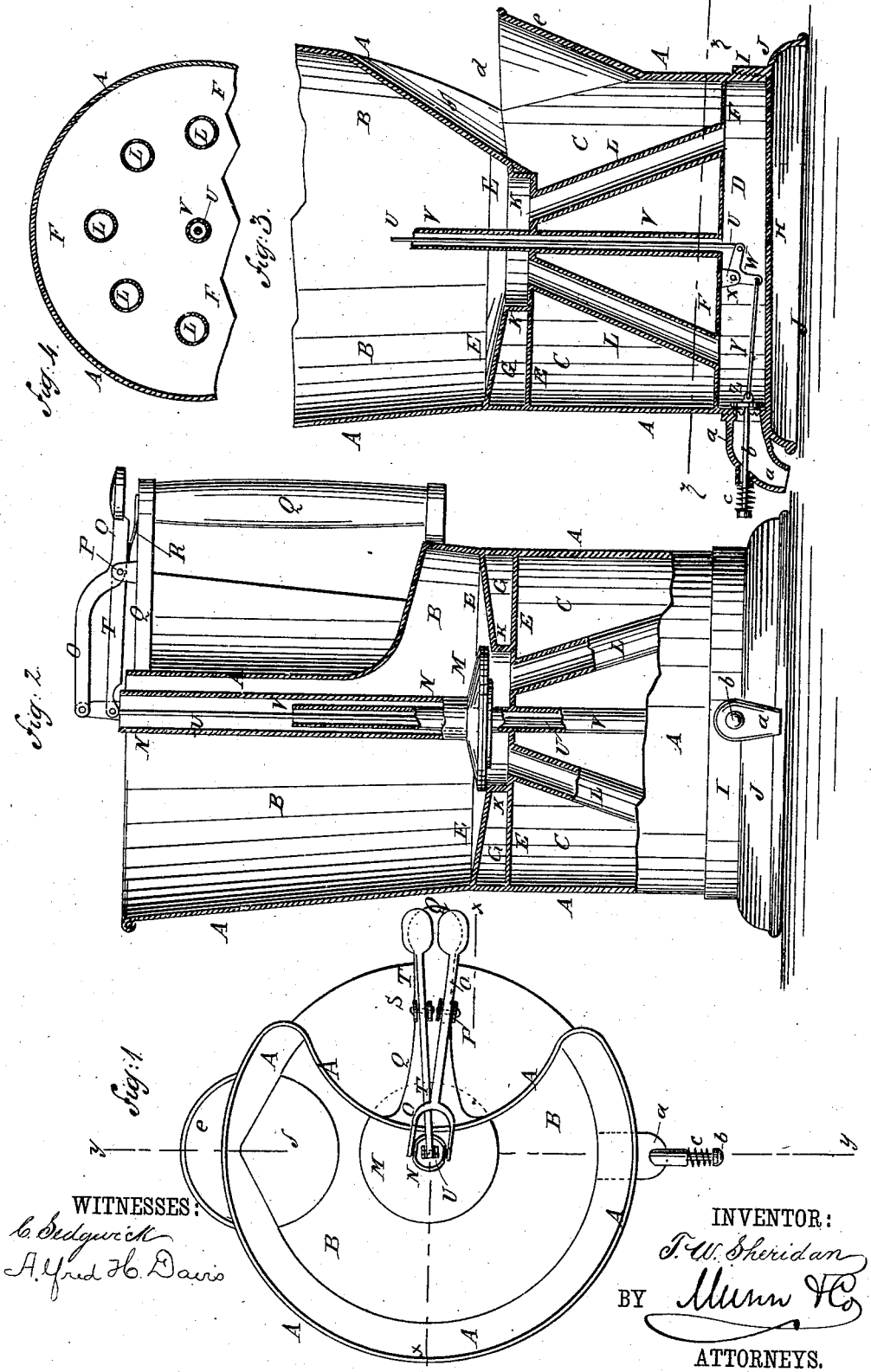

THOMAS W. SHERIDAN, OF NEW YORK, N. Y.

ALE-COOLING MEASURE.

SPECIFICATION forming part of Letters Patent No. 286,967, dated October 16, 1883.

Application filed August 24, 1883. (No model.)

*To all whom it may concern:*

Be it known that I, THOMAS W. SHERIDAN, of the city, county, and State of New York, have invented certain new and useful Improvements in Ale-Cooling Measures, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a side elevation of the same, the upper part of the measure being shown in section through the line $x\,x$, Fig. 1. Fig. 3 is a sectional side elevation of the lower part of the measure taken through the line $y\,y$, Fig. 1. Fig. 4 is a sectional plan view of the lower part of the same on the line $z\,z$, part being broken away.

The object of this invention is to provide a means for cooling ale without making it flat, cloudy, and sour, and without any danger of injuring the ale in the barrel.

The invention consists in an ale-cooling measure constructed with a shell divided into three compartments by cross-partitions, and provided with conducting-pipes and with valves operated by thumb-levers connected with the handle. The partition between the receiving chamber and the cooling-chamber is made double, and with an intervening air-space to prevent the ale in the receiving-chamber from being cooled and injured from the cooling-chamber. The bottom is made with an annular screw-flange, to screw upon the lower end of the shell, whereby the said bottom can be removed to give access to the discharge-chamber. To the centers of the partitions is secured a tube, to serve as a ventilating-flue and as a conduit for a connecting-rod. The shell of the measure is made with a recess in the upper part of its side, to receive the hand that grasps the handle and bring the point of support as near the center of gravity as practical, as will be hereinafter fully described.

A represents the shell or wall of the measure, the interior of which is divided into a large ale-receiving chamber, B, a large ice-receiving chamber, C, and a small ale-discharge chamber, D, by the partitions E F. The partition E is made double, and with an intervening air-space, G, to prevent the ale while in the chamber B from being cooled, and thus made flat, cloudy, and sour.

The bottom H is made with an annular flange, I, having an interior screw-thread, to screw upon an exterior screw-thread on the lower end of the shell A, so that the said bottom can be readily detached, to allow the chamber D to be readily cleaned. The bottom H is also made with a downwardly-flaring flange, J, to serve as a foot to the measure.

In the center of the upper part of the double partition E is formed an opening, and the inner edge of the said part is connected with the lower part of the said partition by an annular band, K. The upper part of the partition E is slightly inclined toward its central opening, and in the lower part of the said partition, within the circle of the band K, are formed eight (more or less) openings, in which are secured the upper ends of the pipes L. The pipes L are open at both ends, incline outward, as shown in Figs. 2 and 3, and their lower ends are secured in openings in the partition F. The central opening in the upper part of the partition E is closed by a valve, M, attached to the lower end of the tube N, which extends to the top of the measure, and to the opposite sides of its upper end is pivoted the forked inner end of the lever O. The lever O is pivoted to lugs P, attached to the upper arm of the handle Q, which is secured to the shell A of the measure. The outer arm of the lever O is pressed upward, holding the valve M to its seat by a spring, R, attached to the upper arm of the handle Q. The shell A, opposite the handle Q, is concaved or bent inward, as shown in Figs. 1 and 2, to form a space for the hand, so as to bring the hand as near as possible to the center of the measure, and thus make it easier to carry and use the said measure.

To lugs S, also attached to the upper arm of the handle Q, is pivoted a lever, T, the inner end of which is pivoted to the upper end of the rod U. The rod U passes down through the tube V, placed within the tube or hollow valve-stem N, and passing down through and secured to the centers of the lower part of the partition E and of the partition F. The tube V is open at both ends, serves as a ventilating-flue, and extends so far up in the tube N that the ale from the chamber D cannot flow out at the upper end of the said tube V. The lower end of the rod U is pivoted to the arm of a small bell-crank lever, W, which is pivoted at its angle to lugs X, attached to the lower side of the partition F. The other arm of the lever W is pivoted to the end of a rod, Y, the other end of which is pivoted to the valve Z, which closes the opening at the inner end of the discharge-nozzle $a$, secured in an opening in the lower part of the shell A. The stem $b$ of the valve Z passes out through the discharge-nozzle $a$, and has a spring, $c$, connected with its outer end and resting against the said nozzle, so as to hold the said valve Z firmly to its seat.

In the side of the shell A is formed an opening, $d$, leading into the chamber C, and which is enlarged by a flaring lip, $e$, secured to the said shell A at the lower edge of the said opening $d$, and by an inward bend, $f$, of the said shell A, as shown in Figs. 1 and 2, so that ice can be readily introduced through the said opening, to come in contact with the pipes L and cool the ale as it flows through the said pipes from the chamber B into the chamber D.

In using the measure the desired quantity of ale is drawn into the upper chamber, B, from the faucet attached to the pipe leading to the ale-barrel. Then, with the thumb of the hand that grasps the handle Q the lever O is operated to open the valve M and allow the ale to flow through the cooling-pipes L to the chamber D. The lever T is then operated to open the valve Z and allow the ale to flow through the nozzle $a$ into a glass or pitcher. By this arrangement the ale will be cooled without being made flat, clouded, or sour, and the cold cannot be conducted through the pipe connected with the ale-barrel to make the ale in the said barrel flat, clouded, and sour, as is liable to happen when the cooling apparatus is connected with the said pipe. With this construction ale can be allowed to stand in the upper chamber, B, without being injured by the cold, from which it is protected by the double partition E.

Having thus described my invention, what I claim as new, and desire to secure by Letters Patent, is—

1. An ale-cooling measure constructed substantially as herein shown and described, and consisting of the shell divided into three compartments by partitions, and provided with conducting-pipes and with valves operated by thumb-levers connected with the handle, as set forth.

2. In an ale-cooling measure, the combination, with the shell A, of the partitions E F, the pipes L, and the valve M, tube N, and lever O, substantially as herein shown and described, whereby the ale can be allowed to flow from the receiving-chamber to the discharge-chamber without being injured by too long a contact with the cooler, as set forth.

3. In an ale-cooling measure, the combination, with the shell A, the partitions E F, the valve M, the tubular valve-stem N, and the handle Q, of the spring-held valve Z, the connecting-rods Y U, the bell-crank lever W, and the thumb-lever T, substantially as herein shown and described, whereby the ale can be discharged while flowing through the cooler, or afterward, as set forth.

4. In an ale-cooling measure, the combination, with the shell A, of the double partition E, having intervening air-space, G, substantially as herein shown and described, whereby the ale in the receiving-chamber is kept from being cooled and injured from the cooling-chamber, as set forth.

5. In an ale-cooling measure, the combination, with the partitions E F and the tubular valve-stem N, of the tube V, to serve as a ventilating-flue and as a conduit for a connecting-rod, as set forth.

6. In an ale-cooling measure, the shell A, made, substantially as herein shown and described, with a recess in the upper part of its side to receive the hand that grasps the handle and bring the point of support as near the center of gravity as practicable, as set forth.

THOMAS W. SHERIDAN.

Witnesses:
JAMES T. GRAHAM,
C. SEDGWICK.